INVENTOR.
Alfred E. Deyo.
BY Arthur L. Slee.
ATTORNEY.

Patented June 6, 1933

1,913,267

UNITED STATES PATENT OFFICE

ALFRED E. DEYO, OF SAN FRANCISCO, CALIFORNIA

ROCK DRILL

Application filed February 1, 1932. Serial No. 589,999.

This invention relates to a rock drill of the type pneumatically driven to cut by percussion. Such drills are subject to about 2500 percussions per minute while cutting. The practice has arisen of using a drill rod and separable drill bits since the rod and the bits can be made with the desired strain and wear characteristics. Thus the rod can be made of a material and heat treated to resist fatigue while the bits can be made of a material and heat treated to resist percussion and cut hard, abrasive rock. The bits are made detachable and the driller attaches a new bit as soon as the one on the drill rod becomes dull and ineffective. Since the bits are not usually thereafter annealed, refaced and heat treated, the initial cost is a factor in marketing the bits. As many as sixty-five bits have been used in cutting an inch and a half hole to a depth of a foot in a very hard formation.

The bit is simultaneously percussively driven and turned by a ratchet on the pneumatic jack-hammer so that a reaming and chipping action, as well as a drilling action, is secured. As a consequence, since the outer cutting face portions of the bit is moving thru a greater lineal distance than the inner cutting face portions, the drill wears away most rapidly at the outer edges thereof the place where, it is most undesirable.

It is an object of the present invention to provide a rock drill of a practical character that can be manufactured simply and cheaply.

Another object of the present invention is to provide an improved drill rod and bit connection construction.

Another object of the present invention is to provide an improved rock drill construction.

A further object of the present invention is to provide a rock drill wherein a bit has a cutting edge made up of a plurality of cutting portions; the length of each portion is substantially proportional to the lineal distance traversed by that portion in use so that, on a unit basis, an equal length of cutting edge is provided based upon the speed of rotation of any portion of the bit.

A further object of the invention is to provide an improved drill rod and bit connection, particularly one that can be quickly assembled or broken and which, nevertheless, will successfully transmit percussive forces to the bit from the rod.

The invention possesses numerous other advantageous features and objects, some of which will appear, together with the foregoing, in the following wherein I have disclosed a preferred embodiment of the rock drill of my invention. It is to be remarked that the rock drill art, as practically known, is markedly free of any particularly satisfactory bit and rod. While on paper extravagant claims have been made by some, these have not been substantiated by use and time, the real critics. The present invention is the result of much practical experience in the operation of rock drills and experimentation with many different types of bits in an endeavor to find one which was really satisfactory for rock drilling.

In the drawings:—

Figure 1:
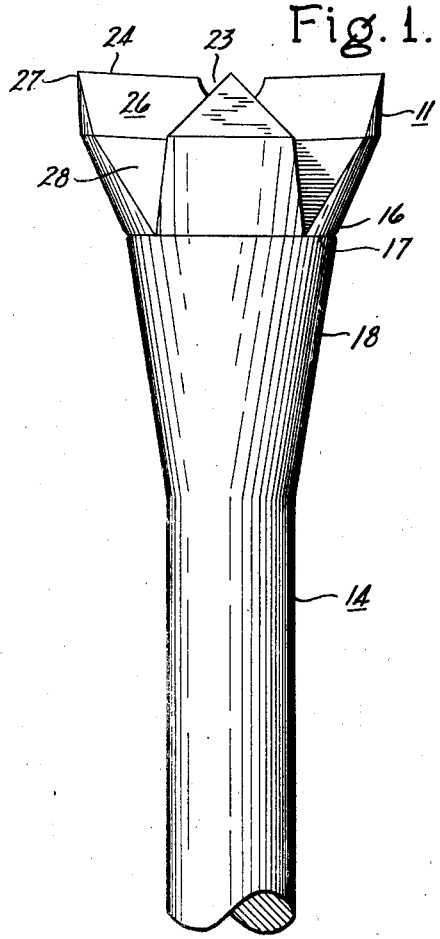
Fig. 1 is a side elevation of a rod and bit embodying my invention.
Figure 2:
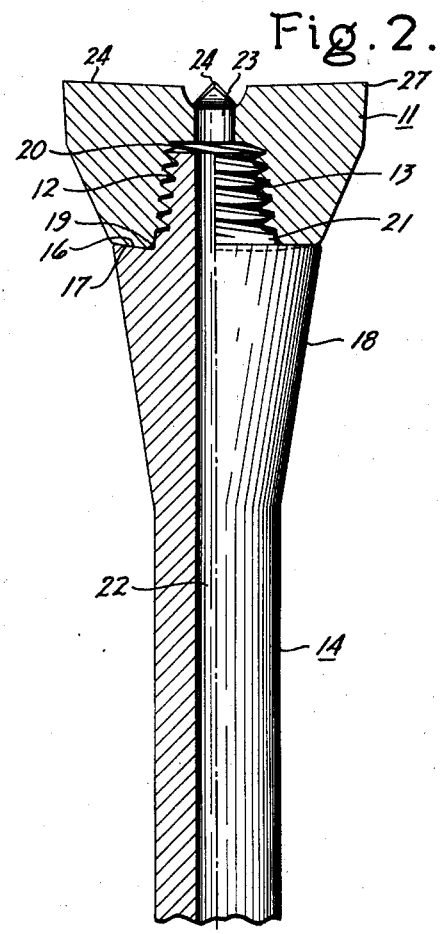
Fig. 2 is a side view partly in elevation and in section to show connection of the bit and rod.

In Figures 1 to 4 inclusive, a bit 11 is provided with an internal thread 12 which is adapted to be engaged with a threaded portion 13 on a drill rod 14. The threaded portions are preferably tapered and the thread per se is cut so that the bit and rod fit together loosely until the back face 16 on the bit abuts against face 17 on a shoulder 18 on the rod 14. When faces 16 and 17 abut, the side of the threads away from the shoulder 18 engages, as is seen in Fig. 2. This insures that, if any particle of dust or rock becomes jammed between the faces 16 and 17, the threads will not be damaged or the bit locked on the rod.

The drill rod is driven percussively and is rotated by the usual pneumatic hammer during the percussive driving. The threads are such that the bit is tightened on the rod by rotation of the rod. Removal of the bit is facilitated and stress transmission between the rod and the bit is improved by forming a rounded corner 19 on the face 16 of the bit adjacent base portion 21 of the threaded portion 13 of the rod. Threaded portion 21 is shorter than internal thread 12 so that a space 20 is between bit 11 and rod 14 as seen in Fig. 2. This space prevents driving of the bit from the end of threaded portion 13 and ensures that the driving takes place thru the shoulder 18 into face 16 on the bit and thru base 21.

Securing of the bit on the rod and stress transmission is facilitated by forming face 16 on the bit slightly convex and face 17 on the shoulder 18 slightly concave so that the two faces fit together as appears in Fig. 2. An angle of 7° has been found to be satisfactory.

In accordance with my invention, the relation between the rod and the portions of the rod in engagement with the bit is a particular one. Thus, I prefer that the shoulder 18, which I form by upsetting the end of the rod and tapering the shoulder into the rod, has face 17 thereon to engage the bit. This face in extent I prefer be about equal to the effective area of the rod. The effective area of the rod is the transverse cross sectional area of the rod remaining after fluid hole 22 is formed. In the drawings this hole is shown at the center of the body. Other holes can also be provided so as to discharge fluid over faces 26 to clean them from sticky clay when such is encountered. I also prefer that the effective area of the base portion 21 of threaded portion 13 be equal to the effective area of the rod and therefore that of face 17. The total transverse area in contact with the bit is therefore substantially twice that of the effective area of the rod. Rods and bits constructed with these parts in this relationship are satisfactory in use and seldom fail or fracture at the point of connection.

The transmission of forces from the rod to the bit when they are proportioned and constructed, as I have set forth, does not occasion any serious stresses ultimately resulting in failure of the bit due to fracture, in jamming of the threads or in fracture of the rod. It must be remembered that there are about 2500 percussive blows per minute. This results in extreme vibratory effects set up in the rod and bit that are most severe. Even when the rod is constructed of tool stock treated to resist fatigue and the bit is constructed of an alloy steel to resist wear, the connection of these is a problem which has only been solved satisfactorily by this invention. Thus, the thread for attachment of the bit is formed on the rod and can be heat treated satisfactorily to be tough altho not so hard as to be brittle and liable to fracture. The bit is a solid body which presents no unusual heat treatment problem since it has no extending threaded portion which must be softer but tougher than the body of the bit to resist fracture. Also, a bit formed as shown can be manufactured by drop forging, cleaned up on a grinding wheel, threaded and drilled to provide fluid passage 23 and then heat treated to be of a uniform hardness. Since the bits are usually used but once and thrown away when worn out, the cost of material wasted, as well as cost of material initially, is reduced since a threaded projecting portion is not provided on each bit.

The bit has a plurality of cutting edges 24 thereon extending radially from the center of the bit. In Figures 1 to 4 inclusive, these edges, four in number, are created by faces 26 positioned at an angle of 45° and forming reaming edges 27 at the periphery of the body. Between adjacent faces 26, passages 28 are provided to permit exit of fluid so that cuttings may be swept away without interfering with the action of the bit, the passages extending in to the shoulder on the rod.

It is to be remarked that this bit can be readily formed by drop forging and the faces 26 cleaned up to provide the cutting edges and the body to provide reaming edges 27 by use of a grinding wheel. In the same way the drill, when worn, can be renewed, being possibly ground to a smaller size.

Figure 3:
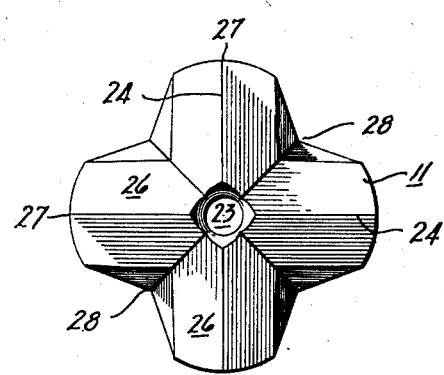
Fig. 3 is a plan view of a bit.
Figure 4:
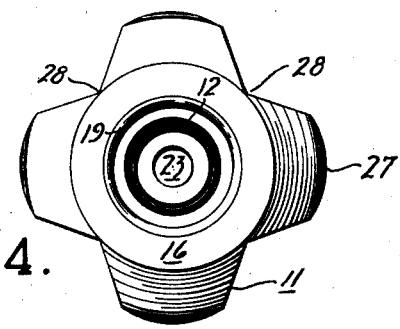
Fig. 4 is a rear view of the bit shown in Fig. 3.

In use, the drill wears down most rapidly at the outer edge since, with the cutting edges formed as shown in Figure 3, the edge portion at the outer edge of the drill covers a greater lineal distance than that portion at the center. In the form of bits shown in Figures 5 to 8 inclusive, I have disclosed bits in which this difficulty is obviated. Thus, in Figures 5 and 7 I provide, on adjacent faces 26, projections 29 on which peripheral cutting edges 31 are formed. These edges supplement edges 24 and thereby the edges of the drill wear down uniformly, substantially, thus preserving the effectiveness of the drill. The bit shown provides also those features mentioned in connection with drill shown in Figures 1 to 4 inclusive.

Figure 5:
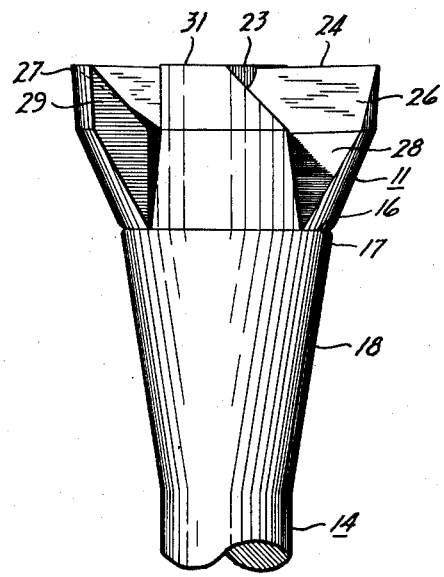
Fig. 5 is an elevation of another bit.
Figure 6:
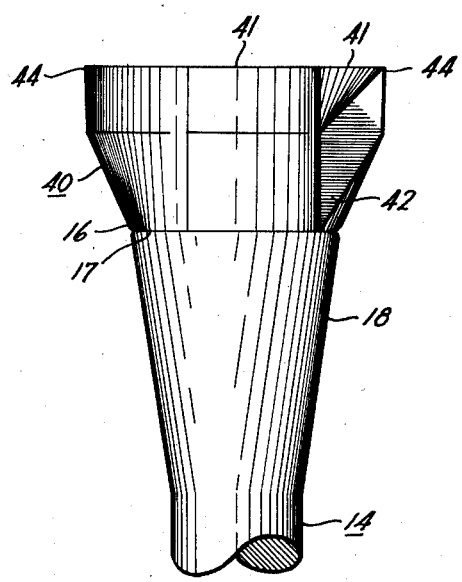
Fig. 6 is an elevation of another bit.
Figure 7:
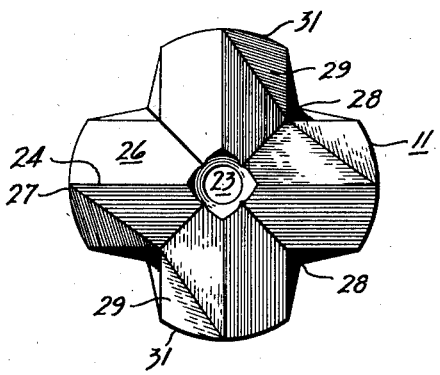
Fig. 7 is a plan view of the bit shown in Fig. 5.
Figure 8:
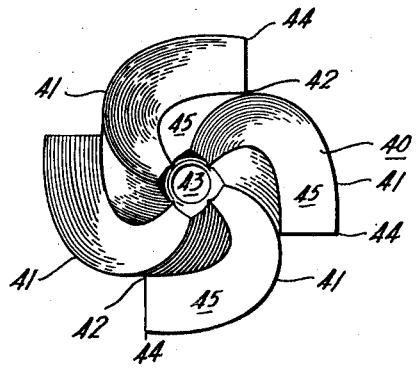
Fig. 8 is a plan view of the bit shown in Fig. 6.

In Figures 6 and 8 I have shown bit 40 in which the advantages mentioned in connection with Figures 5 and 7 is secured. In this form, a plurality of cutting edges 41 are formed by angular faces 45 in which sections of any one cutting edge are of a length proportional substantially to the radial distance of the particular section from the center of the body of the bit. The edges thus are formed to wear down substantially equally, any section of an edge, on a unit basis, traversing substantially the same distance as any other section of that edge. The edges are curved from the center in the bit shown substantially in the form of an involute of a circle, a well known form of curve. The body is cut away as at 42 to form passages for fluid from fluid opening 43 and cuttings and to form reaming edges 44.

As many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having thus described my invention what I claim as new and desire to secure by Letters Patent is—

1. A drill comprising a drill rod terminating in a concave face and having a tapered threaded central projection, and a bit having a threaded tapered bore adapted to receive the projection and having a convex face adapted to contact the concave face of the rod when the threads are engaged.

2. A drill comprising a drill rod terminating in a concave face and having a tapered threaded projection forming substantially a right angle with the concave face, and a bit having a threaded tapered bore adapted to receive the projection and having a convex face adapted to contact the concave face of the rod when the threads are engaged.

3. A drill comprising a drill rod terminating in a concave face having a tapered threaded central projection and a bit having a threaded tapered bore adapted to receive the projection and having a convex face adapted to contact the concave face of the rod, the thread on the projection having a loose fit with the thread in the bore so as to allow the bit to be firmly clamped between one face of the thread of the projection and the concave face of the rod.

4. A drill comprising a drill rod terminating in a concave face having a tapered threaded central projection rising substantially at right angles to the face of the rod and a bit having a correspondingly tapered bore adapted to receive the projection and having a convex face adapted to contact the concave face of the rod, the thread on the projection having a loose fit with the thread in the bore so as to allow the bit to be firmly clamped between one face of the thread of the projection and the concave face of the rod.

5. A drill comprising a drill rod terminating in a concave face having a tapered threaded central projection rising substantially at right angles to the face of the rod and a bit having a correspondingly tapered bore adapted to receive the projection and having a convex face adapted to contact the concave face of the rod, the thread on the projection having a loose fit with the thread in the bore so as to allow the bit to be firmly clamped between one face of the thread of the projection and the concave face of the rod, the depth of the bore being such as to leave a space between the bottom of the bore and the end of the projection when the bit is in its clamped position.

In witness whereof, I hereunto set my signature.

ALFRED E. DEYO.